United States Patent
Campos, II et al.

(10) Patent No.: US 12,295,453 B2
(45) Date of Patent: May 13, 2025

(54) SOLE STRUCTURE FOR ARTICLE OF FOOTWEAR

(71) Applicant: NIKE, Inc., Beaverton, OR (US)

(72) Inventors: Fidencio Campos, II, Dallas, OR (US); Wesley K. Chan, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 27 days.

(21) Appl. No.: 16/825,363

(22) Filed: Mar. 20, 2020

(65) Prior Publication Data

US 2020/0305551 A1    Oct. 1, 2020

Related U.S. Application Data

(60) Provisional application No. 62/825,098, filed on Mar. 28, 2019.

(51) Int. Cl.
    *A43B 13/20*    (2006.01)

(52) U.S. Cl.
    CPC .................. *A43B 13/206* (2013.01)

(58) Field of Classification Search
    CPC ....... A43B 13/206; A43B 13/20; A43B 21/28; A43B 5/0407; A43B 13/189
    USPC ............................................. 36/28, 29, 35 B
    See application file for complete search history.

(56) References Cited

U.S. PATENT DOCUMENTS

| | | | |
|---|---|---|---|
| 4,817,304 A * | 4/1989 | Parker .................... | A43B 13/20 36/114 |
| 4,936,029 A | 6/1990 | Rudy | |
| 5,353,459 A * | 10/1994 | Potter .................. | A43B 13/206 12/146 R |
| D364,036 S * | 11/1995 | Passke | |

(Continued)

FOREIGN PATENT DOCUMENTS

| | | |
|---|---|---|
| CN | 1213672 C | 8/2005 |
| CN | 109068795 A | 12/2018 |

(Continued)

OTHER PUBLICATIONS

European Patent Office (ISA), International Search Report and Written Opinion for International Application No. PCT/US2020/025203, mailed Jun. 17, 2020.

(Continued)

*Primary Examiner* — Aiying Zhao
(74) *Attorney, Agent, or Firm* — Honigman LLP; Matthew H. Szalach; Jonathan P. O'Brien (57) ABSTRACT

A sole structure for an article of footwear includes a bladder and a cushioning member. The bladder includes a first fluid-filled segment including a first and second terminal ends disposed on opposite ends of the first fluid-filled segment along a first longitudinal axis of the first fluid-filled segment. The first longitudinal axis extends in a first direction from a heel region to a forefoot region of the article of footwear. A second fluid-filled segment is spaced apart from the first fluid-filled segment in a second direction transverse to the first direction and includes a third and fourth terminal ends disposed on opposite ends of the second fluid-filled segment along a second longitudinal axis of the second fluid-filled segment. A third fluid-filled segment extends in the second direction between the first fluid-filled segment and the second fluid-filled segment. The bladder is received in the cushioning member.

17 Claims, 6 Drawing Sheets

(56) References Cited

U.S. PATENT DOCUMENTS

| | | | | |
|---|---|---|---|---|
| 6,013,340 | A * | 1/2000 | Bonk | C08G 18/4211 |
| | | | | 428/35.2 |
| 6,582,786 | B1 * | 6/2003 | Bonk | A43B 13/206 |
| | | | | 428/476.3 |
| 10,149,513 | B1 | 12/2018 | Eldem et al. | |
| 2002/0078595 | A1 * | 6/2002 | Stubblefield | A43B 13/20 |
| | | | | 36/35 B |
| 2006/0086003 | A1 * | 4/2006 | Tseng | A43B 21/28 |
| | | | | 36/29 |
| 2006/0248750 | A1 * | 11/2006 | Rosenberg | A43B 1/0054 |
| | | | | 36/29 |
| 2008/0083140 | A1 * | 4/2008 | Ellis | A43B 7/142 |
| | | | | 36/140 |
| 2015/0272271 | A1 | 10/2015 | Campos, II et al. | |
| 2016/0075113 | A1 * | 3/2016 | Chang | B32B 25/16 |
| | | | | 428/35.7 |
| 2017/0119096 | A1 | 5/2017 | Greene | |
| 2017/0265566 | A1 * | 9/2017 | Case | A43B 13/12 |

FOREIGN PATENT DOCUMENTS

| | | | |
|---|---|---|---|
| EP | 0456434 | A2 | 11/1991 |
| EP | 714613 | A2 | 6/1996 |
| EP | 1109468 | A1 | 6/2001 |
| KR | 20020014022 | A * | 2/2002 |
| KR | 100900156 | B1 | 6/2009 |
| KR | 20120130542 | A * | 12/2012 ........... A43B 13/206 |
| TW | I549618 | B | 9/2016 |
| WO | WO-9807343 | A1 | 2/1998 |
| WO | WO-2017160946 | A1 | 9/2017 |

OTHER PUBLICATIONS

China Patent Office, First Office Action for Application No. 202080025875.0 mailed Jun. 27, 2022.
United States Patent and Trademark Office, Non-Final Office Action for U.S. Appl. No. 17/734,717 mailed Jul. 1, 2022.
European Patent Office, Communication pursuant to Article 94(3) EPC for Application No. 20721893.4, mailed Jun. 21, 2022.
Taiwan Intellectual Property Office, Office Action and Search Report for TW App. No. 111117171, recieved Apr. 13, 2023.
European Patent Office, Extended EP Search Report for EP App. No. 23202986.8, mailed Jan. 25, 2024.
European Patent Office (EPO), Communication pursuant to Art. 94(3) EPC for EP App. No. 23202986.8, mailed Dec. 16, 2024.

* cited by examiner

SOLE STRUCTURE FOR ARTICLE OF FOOTWEAR

CROSS REFERENCE TO RELATED APPLICATION

This application claims priority to U.S. Provisional Application Ser. No. 62/825,098, filed Mar. 28, 2019, the disclosure of which is hereby incorporated by reference in its entirety.

FIELD

The present disclosure relates generally to sole structures for articles of footwear and more particularly to sole structures incorporating a fluid-filled bladder.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and may be partially formed from a polymer foam material that compresses resiliently under an applied load to cushion the foot by attenuating ground-reaction forces. The midsole may additionally or alternatively incorporate a fluid-filled bladder to increase the durability of the sole structure, as well as to provide cushioning to the foot by compressing resiliently under an applied load to attenuate ground-reaction forces. Sole structures may also include a comfort-enhancing insole or a sockliner located within a void proximate to the bottom portion of the upper and a strobel attached to the upper and disposed between the midsole and the insole or sockliner.

Midsoles employing fluid-filled bladders typically include a bladder formed from two barrier layers of polymer material that are sealed or bonded together. The fluid-filled bladders are pressurized with a fluid such as air, and may incorporate tensile members within the bladder to retain the shape of the bladder when compressed resiliently under applied loads, such as during athletic movements. Generally, bladders are designed with an emphasis on balancing support for the foot and cushioning characteristics that relate to responsiveness as the bladder resiliently compresses under an applied load

DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a bladder for a sole structure for an article of footwear. The bladder includes a first fluid-filled segment including a first terminal end and a second terminal end disposed on opposite ends of the first fluid-filled segment along a first longitudinal axis of the first fluid-filled segment. The bladder also includes a second fluid-filled segment including a third terminal end and a fourth terminal end disposed on opposite ends of the second fluid-filled segment along a second longitudinal axis of the second fluid-filled segment. The second fluid-filled segment is (i) spaced apart from the first fluid-filled segment in a first direction transverse to the first longitudinal axis and the second longitudinal axis and (ii) is convergent with the first fluid-filled segment.

Implementations of the disclosure may include one or more of the following optional features. In some examples, the bladder includes a third fluid-filled segment extending between the first fluid-filled segment and the second fluid-filled segment. Here, the third fluid-filled segment may fluidly couple the first fluid-filled segment and the second fluid-filled segment. Optionally, the third fluid-filled segment may be disposed transverse to the first longitudinal axis and the second longitudinal axis.

In some implementations, a fourth fluid-filled segment and a fifth fluid-filled segment are disposed on opposite sides of the third fluid-filled segment in a direction extending along the first longitudinal axis and the second longitudinal axis. Here, the fourth fluid-filled segment and the fifth fluid-filled segment may fluidly couple the first fluid-filled segment and the second fluid-filled segment. The bladder may include a web area extending between the third fluid-filled segment and the fourth fluid-filled segment and between the third fluid-filled segment and the fifth fluid-filled segment. Here, the web area may be recessed from a plane extending tangent to a first outer surface of the third fluid-filled segment, the fourth fluid-filled segment, and the fifth fluid-filled segment on a first side of the bladder. Optionally, the web area is recessed from a plane extending tangent to a second outer surface of the third fluid-filled segment, the fourth fluid-filled segment, and the fifth fluid-filled segment on a second side of the bladder, the second side of the bladder being formed on an opposite side of the bladder than the first side.

In some configurations, the bladder is formed from a first barrier sheet and a second barrier sheet. The first barrier sheet and the second barrier sheet may be formed from the same material. Optionally, the first barrier sheet and the second barrier sheet may be formed from different materials. One of the first barrier sheet and the second barrier sheet may be substantially transparent and the other of the first barrier sheet and the second barrier sheet may be opaque.

In some implementations, the first fluid-filled segment may taper in a direction along the first longitudinal axis and the second fluid-filled segment may taper in a direction along the second longitudinal axis.

In some examples, the bladder is incorporated into the sole structure for the article of footwear. Here, the first fluid-filled segment and the second fluid-filled segment may converge in a direction from a heel region to a forefoot region of the sole structure.

In some examples, the bladder is incorporated into an article of footwear. Here, the first fluid-filled segment and the second fluid-filled segment may converge in a direction from a heel region to a forefoot region of the article of footwear. Additionally or alternatively, the first fluid-filled segment and the second fluid-filled segment may be exposed at a ground-contacting surface of the article of footwear. The first fluid-filled segment may be exposed at one of a medial side and a lateral side of a sole structure of the article of footwear and the second fluid-filled segment may be exposed at the other of the medial side and the lateral side of the sole structure of the article of footwear.

Another aspect of the disclosure provides an article of footwear. The article of footwear includes a bladder. The bladder includes a first fluid-filled segment including a first terminal end and a second terminal end disposed on opposite ends of the first fluid-filled segment along a first longitudinal axis of the first fluid-filled segment. The first longitudinal axis extends in a first direction from a heel region of the article of footwear to a forefoot region of the article of footwear. A second fluid-filled segment is spaced apart from the first fluid-filled segment in a second direction transverse to the first direction and includes a third terminal end and a fourth terminal end disposed on opposite ends of the second fluid-filled segment along a second longitudinal axis of the second fluid-filled segment. The bladder further includes a third fluid-filled segment extending in the second direction between the first fluid-filled segment and the second fluid-filled segment.

Implementations of this aspect of the disclosure may include one or more of the following optional features. In some implementations, the first fluid-filled segment and the second fluid-filled segment are convergent. The first fluid-filled segment and the second fluid-filled segment may converge in a direction from the heel region to the forefoot region. The third fluid-filled segment may fluidly couple the first fluid-filled segment and the second fluid-filled segment. A fourth fluid-filled segment and a fifth fluid-filled segment may be disposed on opposite sides of the third fluid-filled segment in the first direction. The fourth fluid-filled segment and the fifth fluid-filled segment may fluidly couple the first fluid-filled segment and the second fluid-filled segment. A web area may extend between the third fluid-filled segment and the fourth fluid-filled segment and between the third fluid-filled segment and the fifth fluid-filled segment. The web area may be recessed from a plane extending tangent to a first outer surface of the third fluid-filled segment, the fourth fluid-filled segment, and the fifth fluid-filled segment on a first side of the bladder. Optionally, the web area may be recessed from a plane extending tangent to a second outer surface of the third fluid-filled segment, the fourth fluid-filled segment, and the fifth fluid-filled segment on a second side of the bladder, the second side of the bladder being formed on an opposite side of the bladder than the first side.

In some configurations, the bladder is formed from a first barrier sheet and a second barrier sheet. Here, the first barrier sheet and the second barrier sheet may be formed from the same material or the first barrier sheet and the second barrier sheet may be formed from different materials. One of the first barrier sheet and the second barrier sheet may be substantially transparent and the other of the first barrier sheet and the second barrier sheet may be opaque. Here, the other of the first barrier sheet and the second barrier sheet may form a ground-contacting surface of the article of footwear.

In some examples, the first fluid-filled segment tapers in a direction along the first longitudinal axis and the second fluid-filled segment tapers in a direction along the second longitudinal axis. The first fluid-filled segment and the second fluid-filled segment may be exposed at a ground-contacting surface of the article of footwear. Optionally, the first fluid-filled segment may be exposed at one of a medial side and a lateral side of a sole structure of the article of footwear and the second fluid-filled segment may be exposed at the other of the medial side and the lateral side of the sole structure of the article of footwear.

Referring to FIGS. 1-8, an article of footwear 10 includes an upper 100 and a sole structure 200. The article of footwear 10 may be divided into one or more regions. The regions may include a forefoot region 12, a mid-foot region 14, and a heel region 16. The forefoot region 12 may be subdivided into a toe portion 12a corresponding with phalanges, and a ball portion 12b associated with metatarsal bones of a foot. The mid-foot region 14 may correspond with an arch area of the foot, and the heel region 16 may correspond with rear portions of the foot, including a calcaneus bone. The footwear 10 may further include an anterior end 18 associated with a forward-most point of the forefoot region, and a posterior end 20 associated with a rearward-most point of the heel region 16. A longitudinal axis $A_F$ of the footwear 10 extends along a length of the footwear 10 from the anterior end 18 to the posterior end 20, and generally divides the footwear 10 into a lateral side 22 and a medial side 24. Accordingly, the lateral side 22 and the medial side 24 respectively correspond with opposite sides of the footwear 10 and extend through the regions 12, 14, 16.

Figure 1:
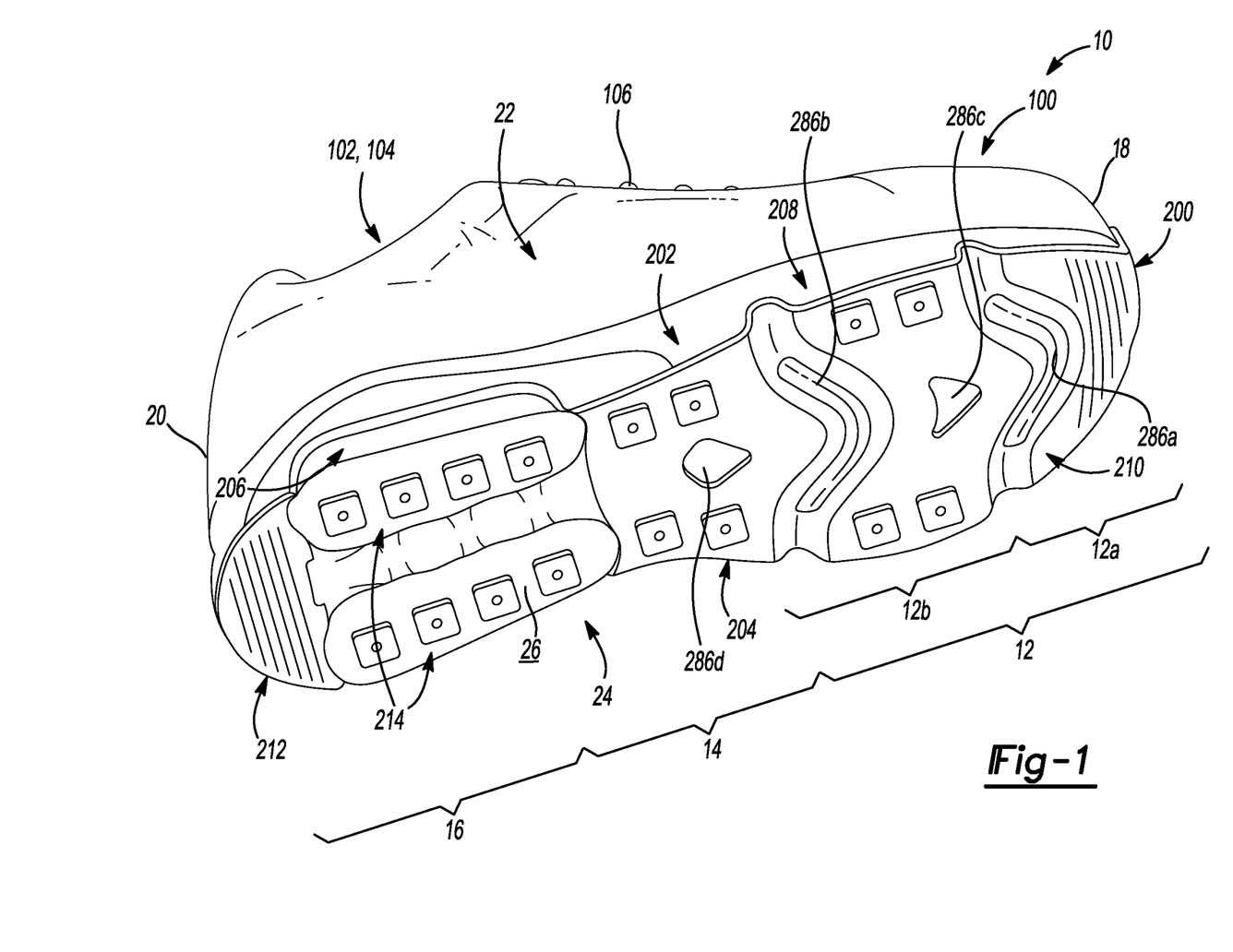
FIG. 1 is a bottom perspective view of an article of footwear in accordance with principles of the present disclosure.

The upper 100 includes interior surfaces that define an interior void 102 configured to receive and secure a foot for support on sole structure 200. The upper 100 may be formed from one or more materials that are stitched or adhesively bonded together to form the interior void 102. Suitable materials of the upper may include, but are not limited to, mesh, textiles, foam, leather, and synthetic leather. The materials may be selected and located to impart properties of durability, air-permeability, wear-resistance, flexibility, and comfort.

In some examples, the upper 100 includes a strobel having a bottom surface opposing the sole structure 200 and an opposing top surface defining a footbed of the interior void 102. Stitching or adhesives may secure the strobel to the upper 100. The footbed may be contoured to conform to a profile of the bottom surface (e.g., plantar) of the foot. Optionally, the upper 100 may also incorporate additional layers such as an insole or sockliner that may be disposed upon the strobel and reside within the interior void 102 of the upper 100 to receive a plantar surface of the foot to enhance the comfort of the article of footwear 10. An ankle opening 104 in the heel region 16 may provide access to the interior void 102. For example, the ankle opening 104 may receive a foot to secure the foot within the void 102 and facilitate entry and removal of the foot from and to the interior void 102.

In some examples, one or more fasteners 106 extend along the upper 100 to adjust a fit of the interior void 102 around the foot and to accommodate entry and removal of the foot therefrom. The fasteners 106 may include laces, straps, cords, hook-and-loop, or any other suitable type of fastener. The upper 100 may include a tongue portion that extends between the interior void 102 and the fasteners.

Figure 2:
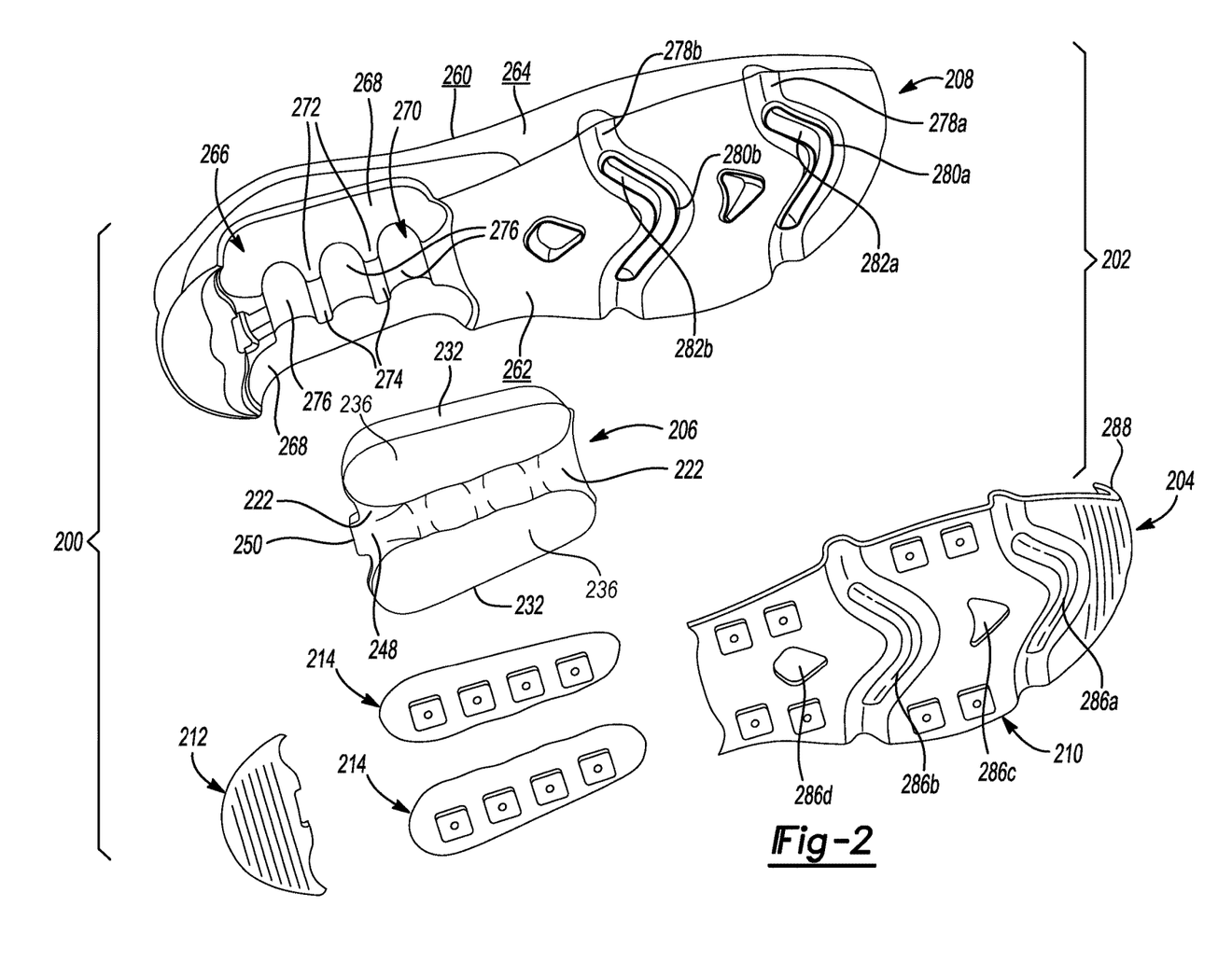
FIG. 2 is an exploded view of a sole structure of the article of footwear of FIG. 1, showing a sole structure having a midsole and an outsole.
Figure 3:
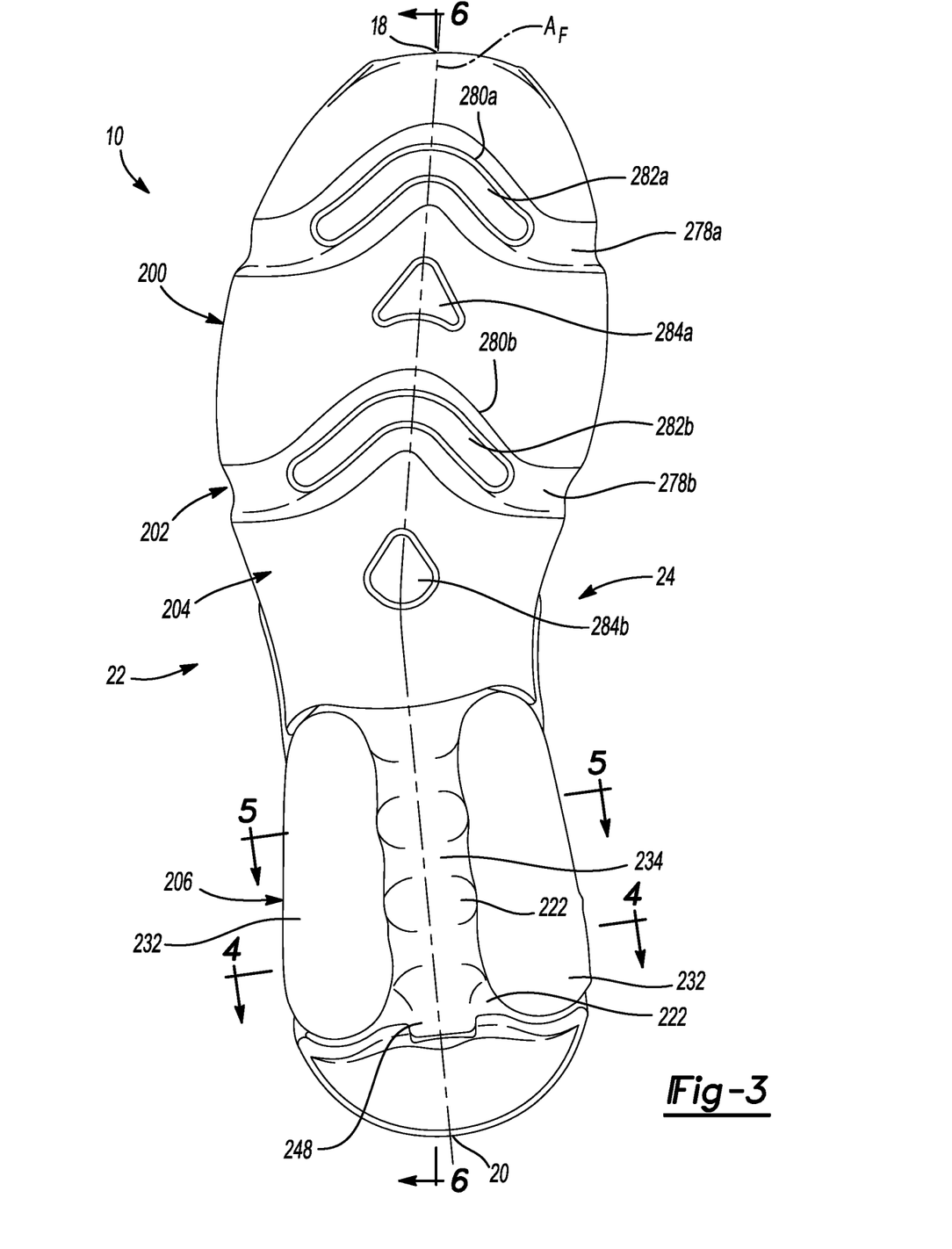
FIG. 3 is a bottom plan view of the midsole of FIG. 2.

With reference to FIG. 2, the sole structure 200 includes a midsole 202 configured to provide cushioning characteristics to the sole structure 200, and an outsole 204 configured to provide a ground-engaging surface 26 of the article of footwear 10. Unlike conventional sole structures, each of the midsole 202 and the outsole 204 are formed compositely, whereby each is formed of multiple subcomponents. For example, the midsole 202 includes a bladder 206 and a cushioning member 208 configured to receive the bladder 206. Likewise, the outsole 204 includes a forefoot segment 210, a heel segment 212, and a pair of bladder segments 214. The subcomponents 206, 208, 210, 212, 214 are assembled and secured to each other using various methods of bonding, including adhesively bonding and melding, for example.

With reference to FIGS. 4-8, the bladder 206 of the midsole 202 includes an opposing pair of barrier layers 216, 218, which can be joined to each other at discrete locations to define a chamber 220, a web area 222, and a peripheral seam 224. In the illustrated embodiment, the barrier layers 216, 218 include a first, upper barrier layer 216 and a second, lower barrier layer 218. Alternatively, the chamber 220 can be produced from any suitable combination of one or more barrier layers.

As used herein, the term "barrier layer" (e.g., barrier layers 216, 218) encompasses both monolayer and multilayer films. In some embodiments, one or both of barrier layers 216, 218 are each produced (e.g., thermoformed or blow molded) from a monolayer film (a single layer). In other embodiments, one or both of barrier layers 216, 218 are each produced (e.g., thermoformed or blow molded) from a multilayer film (multiple sublayers). In either aspect, each layer or sublayer can have a film thickness ranging from about 0.2 micrometers to about be about 1 millimeter. In further embodiments, the film thickness for each layer or sublayer can range from about 0.5 micrometers to about 500 micrometers. In yet further embodiments, the film thickness for each layer or sublayer can range from about 1 micrometer to about 100 micrometers.

The lower barrier layer 218 may have a greater thickness than the upper barrier layer 216, whereby the lower barrier layer 218 is configured to provide a portion of the ground-contacting surface 26 of the article of footwear. As discussed in greater detail below, the bladder segments 214 of the outsole 204 may be integrally formed as part of the lower barrier layer 218.

One or both of barrier layers 216, 218 can independently be transparent, translucent, and/or opaque. For example, the upper barrier layer 216 may be transparent, while the lower barrier layer 218 is opaque. As used herein, the term "transparent" for a barrier layer and/or a fluid-filled chamber means that light passes through the barrier layer in substantially straight lines and a viewer can see through the barrier layer. In comparison, for an opaque barrier layer, light does not pass through the barrier layer and one cannot see clearly through the barrier layer at all. A translucent barrier layer falls between a transparent barrier layer and an opaque barrier layer, in that light passes through a translucent layer but some of the light is scattered so that a viewer cannot see clearly through the layer.

Barrier layers 216, 218 can each be produced from an elastomeric material that includes one or more thermoplastic polymers and/or one or more cross-linkable polymers. In an aspect, the elastomeric material can include one or more thermoplastic elastomeric materials, such as one or more thermoplastic polyurethane (TPU) copolymers, one or more ethylene-vinyl alcohol (EVOH) copolymers, and the like.

As used herein, "polyurethane" refers to a copolymer (including oligomers) that contains a urethane group (—N(C═O)O—). These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having (—N(C═O)O—) linkages.

Examples of suitable isocyanates for producing the polyurethane copolymer chains include diisocyanates, such as aromatic diisocyanates, aliphatic diisocyanates, and combinations thereof. Examples of suitable aromatic diisocyanates include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular aspects, the polyurethane polymer chains are produced from diisocynates including HMDI, TDI, MDI, H12 aliphatics, and combinations thereof. In an aspect, the thermoplastic TPU can include polyester-based TPU, polyether-based TPU, polycaprolactone-based TPU, polycarbonate-based TPU, polysiloxane-based TPU, or combinations thereof.

In another aspect, the polymeric layer can be formed of one or more of the following: EVOH copolymers, poly(vinyl chloride), polyvinylidene polymers and copolymers (e.g., polyvinylidene chloride), polyamides (e.g., amorphous polyamides), amide-based copolymers, acrylonitrile polymers (e.g., acrylonitrile-methyl acrylate copolymers), polyethylene terephthalate, polyether imides, polyacrylic imides, and other polymeric materials known to have relatively low gas transmission rates. Blends of these materials as well as with the TPU copolymers described herein and optionally including combinations of polyimides and crystalline polymers, are also suitable.

The barrier layers 216, 218 may include two or more sublayers (multilayer film) such as shown in Mitchell et al., U.S. Pat. No. 5,713,141 and Mitchell et al., U.S. Pat. No. 5,952,065, the disclosures of which are incorporated by reference in their entirety. In embodiments where the barrier layers 216, 218 include two or more sublayers, examples of suitable multilayer films include microlayer films, such as those disclosed in Bonk et al., U.S. Pat. No. 6,582,786, which is incorporated by reference in its entirety. In further embodiments, barrier layers 216, 218 may each independently include alternating sublayers of one or more TPU copolymer materials and one or more EVOH copolymer materials, where the total number of sublayers in each of barrier layers 216, 218 includes at least four (4) sublayers, at least ten (10) sublayers, at least twenty (20) sublayers, at least forty (40) sublayers, and/or at least sixty (60) sublayers.

The chamber 220 can be produced from barrier layers 216, 218 using any suitable technique, such as thermoforming (e.g. vacuum thermoforming), blow molding, extrusion, injection molding, vacuum molding, rotary molding, transfer molding, pressure forming, heat sealing, casting, low-pressure casting, spin casting, reaction injection molding, radio frequency (RF) welding, and the like. In an aspect, barrier layers 216, 218 can be produced by co-extrusion followed by vacuum thermoforming to produce an inflatable chamber 220, which can optionally include one or more valves (e.g., one way valves) that allows the chamber 220 to be filled with the fluid (e.g., gas).

The chamber 220 can be provided in a fluid-filled (e.g., as provided in footwear 10) or in an unfilled state. The chamber 220 can be filled to include any suitable fluid, such as a gas or liquid. In an aspect, the gas can include air, nitrogen ($N_2$), or any other suitable gas. In other aspects, the chamber 220 can alternatively include other media, such as pellets, beads, ground recycled material, and the like (e.g., foamed beads and/or rubber beads). The fluid provided to the chamber 220 can result in the chamber 220 being pressurized. Alternatively, the fluid provided to the chamber 220 can be at atmospheric pressure such that the chamber 220 is not pressurized but, rather, simply contains a volume of fluid at atmospheric pressure.

The chamber 220 desirably has a low gas transmission rate to preserve its retained gas pressure. In some embodiments, the chamber 220 has a gas transmission rate for nitrogen gas that is at least about ten (10) times lower than a nitrogen gas transmission rate for a butyl rubber layer of substantially the same dimensions. In an aspect, the chamber 220 has a nitrogen gas transmission rate of 15 cubic-centimeter/square-meter·atmosphere·day ($cm^3/m^2 \cdot atm \cdot day$) or less for an average film thickness of 500 micrometers (based on thicknesses of barrier layers 216, 218). In further aspects, the transmission rate is 10 $cm^3/m^2 \cdot atm \cdot day$ or less, 5 $cm^3/m^2 \cdot atm \cdot day$ or less, or 1 $cm^3/m^2 \cdot atm \cdot day$ or less.

In some implementations, the upper barrier layer 216 and the lower barrier layer 218 cooperate to define a geometry (e.g., thicknesses, width, and lengths) of the chamber 220. For example, the web area 222 and the peripheral seam 224 may cooperate to bound and extend around the chamber 220 to seal the fluid (e.g., air) within the chamber 220. Thus, the chamber 220 is associated with an area of the bladder 206 where interior surfaces of the upper and lower barrier layers 216, 218 are not joined together and, thus, are separated from one another.

As shown in FIGS. 4-6 and 8, a space formed between opposing interior surfaces of the upper and lower barrier layers 216, 218 defines an interior void 226 of the chamber 220. Similarly, exterior surfaces of the upper and lower barrier layers 216, 218 define an exterior profile of the chamber 220. Accordingly, the upper and lower barrier layers 216, 218 define respective upper and lower surfaces 228, 230 of the bladder 206. Thicknesses $T_C$ of the chamber 220 are defined by the distance between the upper and lower surfaces 228, 230 of the bladder 206, as discussed in greater detail below.

Referring to FIGS. 2-8, the chamber 220 includes a plurality of segments 232, 234 that cooperate to provide characteristics of responsiveness and support to the midsole 202. Particularly, the segments 232, 234 may be described as including a pair of cushions 232 that are connected (i.e., in fluid communication) with each other by one or more conduits 234. When assembled to in the sole structure 200, the cushions 232 of the chamber 220 are configured to be at least partially exposed along a peripheral edge of the sole structure 200. The cushions 232 are disposed in the heel region 16 and extends into the mid-foot region 14 of the article of footwear 10.

Figure 7:
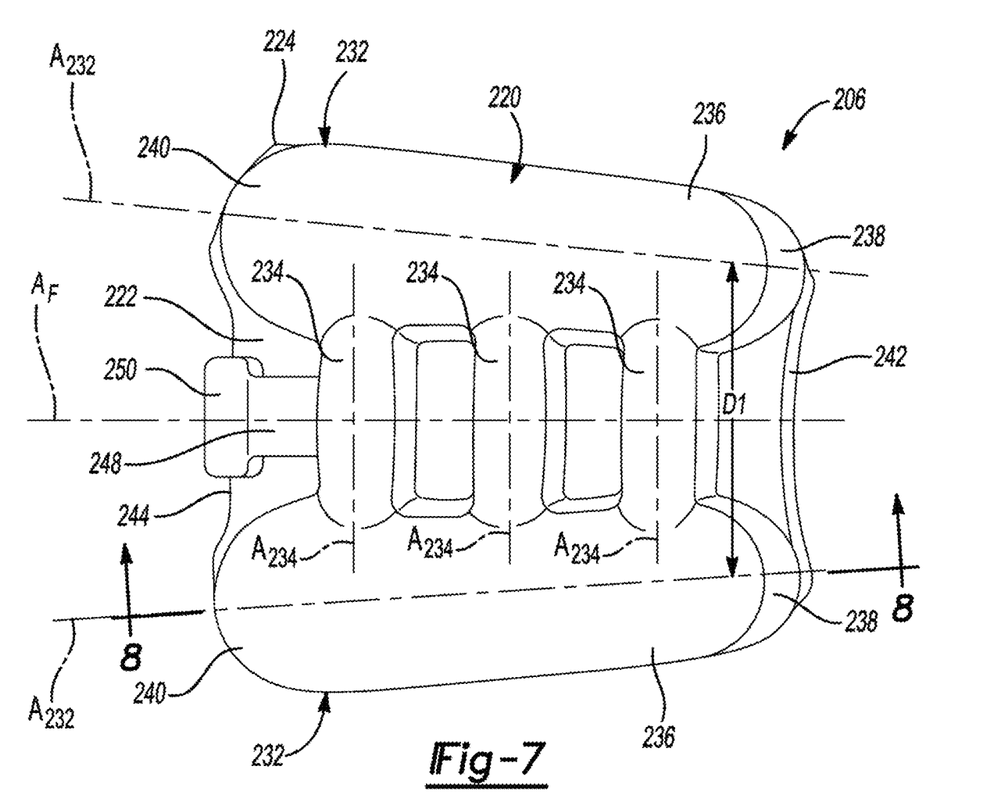
FIG. 7 is a top plan view of a bladder of the article of footwear of FIG. 1.

Referring to FIG. 7, each of the cushions 232 includes tubular body 236, a first terminal end 238 disposed at a first end of the tubular body 236, and a second terminal end 240 disposed at an opposite end of the tubular body 236 from the first terminal end 238. As shown in FIG. 7, the tubular body 236 of one cushion 232 is generally symmetrical to the tubular body 236 of the other cushion. Accordingly, the following description of the tubular body 236 is applicable to both of the cushions. The tubular body 236 defines a substantially circular cross section that extends along a longitudinal axis $A_{232}$ of the cushion 232. As shown, the thickness $T_C$ of the tubular body 236 increases continuously along the longitudinal axis $A_{232}$ from a first thickness $T_{C1}$ at the first terminal end 238 to a second thickness $T_{C2}$ at the second terminal end 240. Thus, the thickness $T_C$ of the tubular body 236 may be described as tapering along the direction from the second terminal end 240 to the first terminal end 238.

The first terminal end 238 and the second terminal end 240 of each cushion 232 are substantially dome-shaped, and each includes compound curvatures associated with the respective upper and lower barrier layers 216, 218. For example, the first terminal end 238 of each cushion 232 is formed where an end portion of the upper barrier layer 216 converges with and is joined to the lower barrier layer 218 at the peripheral seam 224 to enclose an anterior end of the tubular body 236. As shown, the upper barrier layer 216 has a first portion extending from the tubular body 236 and having a first radius R1, and a second portion extending between the first portion and the peripheral seam 224 and having a second radius R2. The lower barrier layer 218 has a third portion extending between the tubular body 236 and the peripheral seam 224 and having a third radius R3. The second radius R2 is greater than the first radius R1 and the third radius R3, whereby the second radius R2 provides a relatively flat-faced profile to an intermediate portion of the first terminal end 238. The third radius R3 may be less than the first radius R1.

Figure 8:
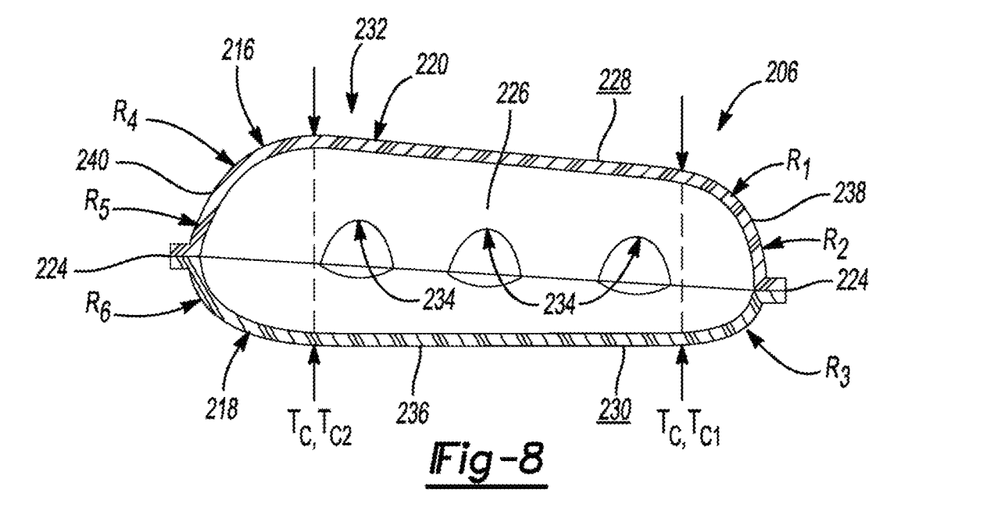
FIG. 8 is a cross-sectional view of the bladder of FIG. 7, taken along line 8-8 of FIG. 7.

Referring still to FIG. 8, the second terminal end 240 of each cushion 232 is formed where another end portion of the upper barrier layer 216 converges with and is joined to the lower barrier layer 218 at the peripheral seam 224 to enclose the opposite end of the tubular body 236. As shown, at the second terminal end 240 the upper barrier layer 216 includes a fourth portion having a fourth radius R4 extending from the tubular body 236 and a fifth portion having a fifth radius R5 between the fourth portion and the peripheral seam 224. The lower barrier layer 218 includes a sixth portion having a sixth radius R6 extending between the tubular body 236 and the peripheral seam 224. The fifth radius R5 is greater than the fourth radius R4 and the sixth radius R6, whereby the fifth radius R5 provides a relatively flat-faced profile to an intermediate portion of the second terminal end 240. The sixth radius R6 may be less than the fourth radius R4.

As provided above, each of the cushions 232 defines a respective longitudinal axis $A_{232}$ that extends from the first terminal end 238 to the second terminal end 240, such that an entirety of each of the cushions 232 extends along the longitudinal axis $A_{232}$. As best shown in FIG. 7, the cushions 232 are spaced apart from each other along a direction transverse to the longitudinal axes $A_{232}$ of each of the cushions 232. More particularly, when the bladder 206 is assembled within the sole structure 200, the cushions 232 are spaced apart from each other along a lateral direction of the article of footwear 10, substantially perpendicular to the longitudinal axis $A_F$ of the article of footwear 10. Furthermore, the longitudinal axes $A_{232}$ of the cushions 232 converge with each other and with the longitudinal axis $A_F$ of the article of footwear 10 along the direction from the posterior end 20 to the anterior end 18. Accordingly, a lateral distance D1 between the cushions 232 is greater at the second terminal ends 240 than at the first terminal ends 238.

With continued reference to FIGS. 2-8, the chamber 220 further includes at least one conduit 234 extending between and fluidly coupling the cushions 232. In the illustrated example, the chamber 220 includes a plurality of the conduits 234 connecting the tubular bodies 236 of the cushions 232 to each other. The conduits 234 each extend along respective longitudinal axes $A_{234}$ that are transverse to the longitudinal axes $A_{232}$ of the cushions 232. For example, a central, longitudinal axis $A_{234}$ of at least one conduit 234 extends parallel to a central, longitudinal axis $A_{234}$ of an adjacent conduit 234. As best shown in FIGS. 7 and 8, the conduits 234 include a first conduit 234 extending between the tubular bodies 236 of the cushions 232 adjacent to the first terminal ends 238, a second conduit 234 extending between the tubular bodies 236 of the cushions 232 adjacent to the second terminal ends 240, and a third conduit 234 disposed between the first conduit 234 and the second conduit 234 and connecting intermediate portions of the tubular bodies 236. Accordingly, the first conduit 234 and the second conduit 234 are disposed on opposite sides of the third conduit 234.

Figure 6:
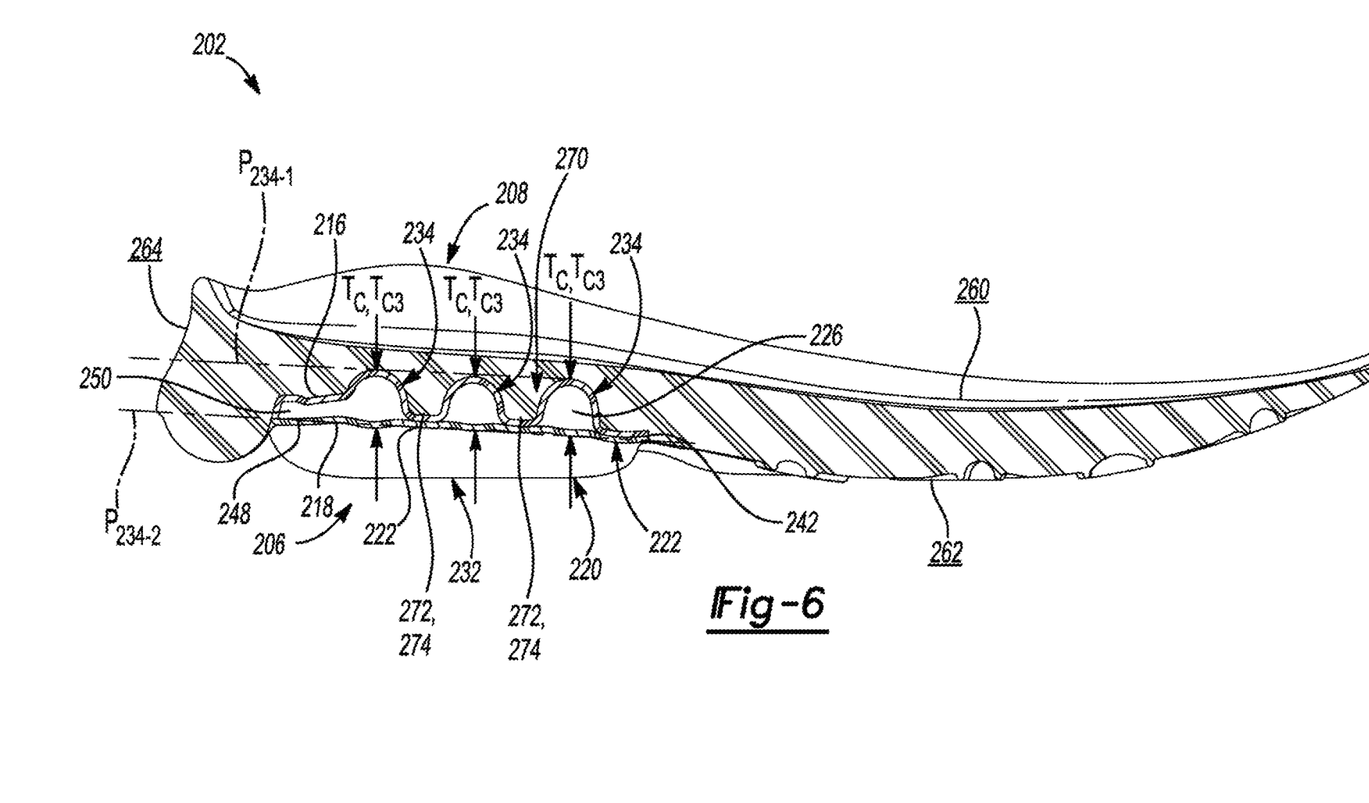
FIG. 6 is a cross-sectional view of the midsole of FIG. 3, taken along line 6-6 of FIG. 3.

As best shown in FIGS. 6 and 8, the conduits 234 are defined by the cooperation of the upper barrier layer 216 and the lower barrier layer 218. As shown in FIG. 6, the upper barrier layer 216 and the lower barrier layer 218 are formed to provide a plurality of semi-cylindrically shaped conduits 234, each having a substantially similar third thickness $T_{C3}$ that is less than the first thickness $T_{C1}$ and the second thickness $T_{C2}$ of the cushions 232. A profile of each of the conduits 234 is substantially imparted by the upper barrier layer 216, whereby the upper barrier layer 216 is molded to define a curved upper portion of each conduit 234 while the lower barrier layer 218 is provided as substantially flat lower portion of each of the conduits 234. Although the lower barrier layer 216 is initially provided in a substantially flat state, the lower barrier layer 218 may bulge from the web area 222 when the interior void 226 of the chamber 220 is pressurized and the lower barrier layer 218 is biased apart from the upper barrier layer 216, as illustrated in FIG. 6.

Figure 4:
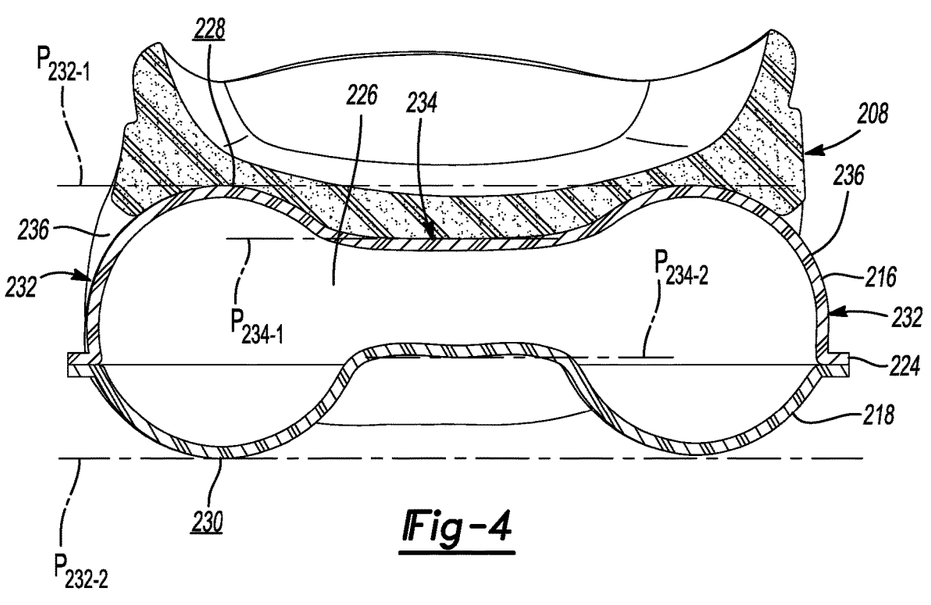
FIG. 4 is a cross-sectional view of the midsole of FIG. 3, taken along line 4-4 of FIG. 3.

The top-most portions of each of the conduits 234, defined by the upper barrier layer 216, are aligned with each other along a first conduit plane $P_{234-1}$. Likewise, the bottom-most portions of each of the conduits 234, defined by the lower barrier layer 218, are aligned with each other along a second conduit plane $P_{234-2}$. As discussed in greater detail below, the web area 222 of the bladder 206 may be recessed from each of the first conduit plane $P_{234-1}$ and the second conduit plane $P_{234-2}$. Furthermore, the first and second conduit planes $P_{234-1}$, $P_{234-2}$ are recessed from first and second cushion planes $P_{232-1}$, $P_{232-2}$ formed by the upper-most and lower-most surfaces of the cushions 232, as best shown in FIG. 4.

Figure 5:
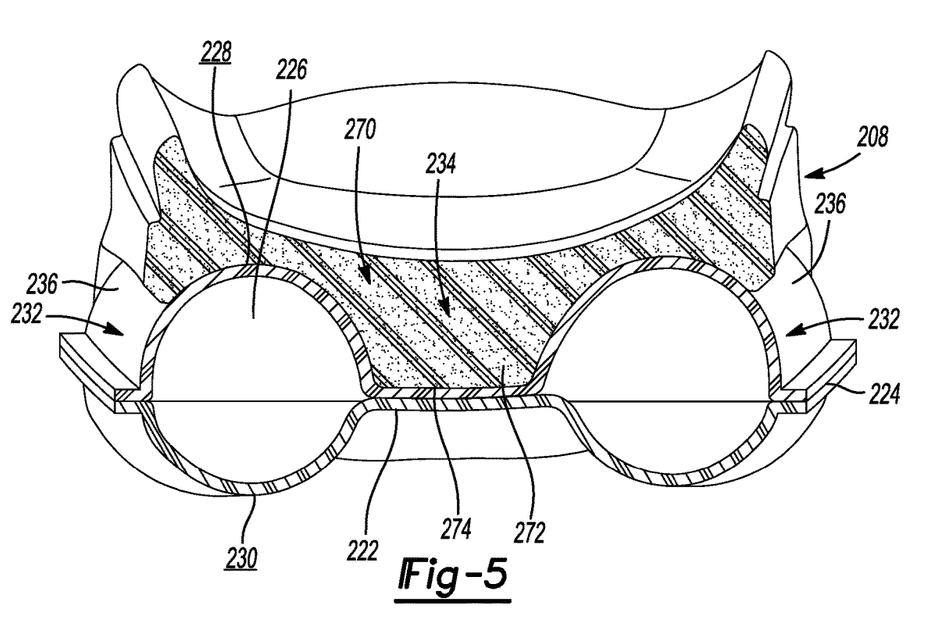
FIG. 5 is a cross-sectional view of the midsole of FIG. 3, taken along line 5-5 of FIG. 3.

With reference to FIGS. 5-7, the web area 222 is formed at a bonded region of the upper barrier layer 216 and the lower barrier layer 218, and extends between and connects each of the segments 232, 234 of the chamber 220. Particularly, the web area 222 includes an anterior portion extending between and connecting the first terminal ends 238 of the respective cushions 232, and defining a first terminal edge 242 at an anterior end of the bladder 206. A posterior portion of the web area 222 extends between and connects the second terminal ends 240 of the cushions 232 and forms a second terminal edge 244 at a posterior end of the bladder 206. Intermediate portions of the web area 222 extend between and connect adjacent ones of the conduits 234 and the cushions 232. For example, the web area 222 is disposed between the conduits 234 and extends continuously and uninterrupted between the cushions 232. Accordingly, the intermediate portions of the web area 222 may be completely surrounded by the chamber 220. In the illustrated example, the web area 222 is disposed vertically intermediate with respect to the thickness $T_C$ of the fluid-filled chamber 220. Put another way, the web area 222 is recessed from the cushion planes $P_{232-1}$, $P_{232-2}$ and the conduit planes $P_{234-1}$, $P_{234-2}$.

The web area 222 includes an inflation conduit 248 configured to provide a fluid passage between a mold cavity (not shown) and the interior of the chamber 220. The inflation conduit 248 extends from an inlet 250 formed adjacent to the posterior, second terminal edge 244 of the web area 222 to the posterior-most one of the conduits 234 of the fluid-filled chamber 220.

In some implementations, the upper and lower barrier layers 216, 218 are formed by respective mold portions each defining various surfaces for forming depressions and pinched surfaces corresponding to locations where the web area 222 and/or the peripheral seam 224 are formed when the upper barrier layer 216 and the lower barrier layer 218 are joined and bonded together. In some implementations, adhesive bonding joins the upper barrier layer 216 and the lower barrier layer 218 to form the web area 222 and the peripheral seam 224. In other implementations, the upper barrier layer 216 and the lower barrier layer 218 are joined to form the web area 222 and the peripheral seam 224 by thermal bonding. In some examples, one or both of the barrier layers 216, 218 are heated to a temperature that facilitates shaping and melding. In some examples, the barrier layers 216, 218 are heated prior to being located between their respective molds. In other examples, the mold may be heated to raise the temperature of the barrier layers 216, 218. In some implementations, a molding process used to form the fluid-filled chamber 220 incorporates vacuum ports within mold portions to remove air such that the upper and lower barrier layers 216, 218 are drawn into contact with respective mold portions. In other implementations, fluids such as air may be injected into areas between the upper and lower barrier layers 216, 218 such that pressure increases cause the barrier layers 216, 218 to engage with surfaces of their respective mold portions.

As shown in FIGS. 2-6, the cushioning member 208 includes a top surface 260 and a bottom surface 262 formed on an opposite side of the cushioning member 208 from the top surface 260. A peripheral surface 264 extends between the top surface 260 and the bottom surface 262, and forms an outer periphery of the sole structure 200. The top surface 260 of the cushioning member 208 defines a profile of the footbed, and may be contoured to correspond to a shape of the foot.

With reference to FIG. 2, the bottom surface 262 of the cushioning member 208 is configured to cooperate with the bladder 206, whereby the bottom surface 262 includes a pocket 266 formed in the heel region 16 and configured to interface with the upper barrier layer 216 of the bladder 206. As shown, the pocket 266 includes a pair of recesses 268 extending along opposite sides of the cushioning member 208, which are configured to receive the cushions 232 of the bladder 206. The recesses 268 may extend through the peripheral surface 264 on the medial side 24 and the lateral side 22 of the cushioning member 208, whereby the cushions 232 of the bladder 206 are exposed and partially protrude from the peripheral surface 264 of the cushioning member 208.

With continued reference to FIG. 2, the pocket 266 may be formed with a central spine 270 extending continuously between the recesses 268 along the direction of the longitudinal axis $A_F$ of the article of footwear 10. As shown, the spine 270 includes a plurality of fingers 272 configured to extend into the recessed portions of the bladder 206 defined by the web area 222. Accordingly, a distal end 274 of each of the fingers 272 opposes and interfaces with the upper barrier layer 216 in the web area 222 of the bladder 206, as best shown in FIGS. 5 and 6. The spine 270 further defines a plurality of channels 276 extending along a lateral direction, transverse to the longitudinal axis $A_F$ of the article of footwear 10, and configured to receive the portions of the conduits 234 formed by the upper barrier layer 216 of the bladder 206. The cooperation of the spine 270, the web area 222, and the conduits 234 provides a desired degree of flexibility along the heel region 16 of the sole structure 200.

Referring again to FIG. 2, the cushioning member 208 includes a pair of grooves 278a, 278b formed in the bottom surface 262 and extending along the lateral direction from the peripheral surface 264 on the lateral side 22 to the peripheral surface 264 on the medial side 24. Each of the grooves 278a, 278b includes a chevron-shaped intermediate portion 280a, 280b, which includes a cavity 282a, 282b formed therein. Accordingly, the cavity 282a, 282b formed in the intermediate portion 280a, 280b of each groove 278a, 278b may be recessed further within the bottom surface 262 than the remainder of the groove 278a, 278b. As shown, a first one of the grooves 278a is formed along the intersection between the toe portion 12a and the ball portion 12b of the forefoot region 12, while a second one of the grooves 278b is formed along the intersection of the forefoot region 12 and the mid-foot region 14.

The cushioning member 208 may further include one or more depressions 284a, 284b formed in the bottom surface 262. As shown, the depressions 284a, 284b are centrally disposed between the lateral side 22 and the medial side 24 of the cushioning member 208. A first one of the depressions 284a is longitudinally disposed between the first groove 278a and the second groove 278b, and has a substantially triangular or arrowhead-like shape. A second one of the depressions 284b is longitudinally disposed between the second groove 278b and the pocket 266, and has a substantially diamond-like shape.

As described above, the cushioning member 208 is formed of a resilient polymeric material, such as foam or rubber, to impart properties of cushioning, responsiveness, and energy distribution to the foot of the wearer. Example resilient polymeric materials for the cushioning member 208 may include those based on foaming or molding one or more polymers, such as one or more elastomers (e.g., thermoplastic elastomers (TPE)). The one or more polymers may include aliphatic polymers, aromatic polymers, or mixtures of both; and may include homopolymers, copolymers (including terpolymers), or mixtures of both.

In some aspects, the one or more polymers may include olefinic homopolymers, olefinic copolymers, or blends thereof. Examples of olefinic polymers include polyethylene, polypropylene, and combinations thereof. In other aspects, the one or more polymers may include one or more ethylene copolymers, such as, ethylene-vinyl acetate (EVA) copolymers, EVOH copolymers, ethylene-ethyl acrylate copolymers, ethylene-unsaturated mono-fatty acid copolymers, and combinations thereof.

In further aspects, the one or more polymers may include one or more polyacrylates, such as polyacrylic acid, esters of polyacrylic acid, polyacrylonitrile, polyacrylic acetate, polymethyl acrylate, polyethyl acrylate, polybutyl acrylate, polymethyl methacrylate, and polyvinyl acetate; including derivatives thereof, copolymers thereof, and any combinations thereof.

In yet further aspects, the one or more polymers may include one or more ionomeric polymers. In these aspects, the ionomeric polymers may include polymers with carboxylic acid functional groups, sulfonic acid functional groups, salts thereof (e.g., sodium, magnesium, potassium, etc.), and/or anhydrides thereof. For instance, the ionomeric polymer(s) may include one or more fatty acid-modified ionomeric polymers, polystyrene sulfonate, ethylene-methacrylic acid copolymers, and combinations thereof.

In further aspects, the one or more polymers may include one or more styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

In further aspects, the one or more polymers may include one or more polyamide copolymers (e.g., polyamide-polyether copolymers) and/or one or more polyurethanes (e.g., cross-linked polyurethanes and/or thermoplastic polyurethanes). Examples of suitable polyurethanes include those discussed above for barrier layers 216, 218. Alternatively, the one or more polymers may include one or more natural and/or synthetic rubbers, such as butadiene and isoprene.

When the resilient polymeric material is a foamed polymeric material, the foamed material may be foamed using a physical blowing agent which phase transitions to a gas based on a change in temperature and/or pressure, or a chemical blowing agent which forms a gas when heated above its activation temperature. For example, the chemical blowing agent may be an azo compound such as adodicarbonamide, sodium bicarbonate, and/or an isocyanate.

In some embodiments, the foamed polymeric material may be a crosslinked foamed material. In these embodiments, a peroxide-based crosslinking agent such as dicumyl peroxide may be used. Furthermore, the foamed polymeric material may include one or more fillers such as pigments, modified or natural clays, modified or unmodified synthetic clays, talc glass fiber, powdered glass, modified or natural silica, calcium carbonate, mica, paper, wood chips, and the like.

The resilient polymeric material may be formed using a molding process. In one example, when the resilient polymeric material is a molded elastomer, the uncured elastomer (e.g., rubber) may be mixed in a Banbury mixer with an optional filler and a curing package such as a sulfur-based or peroxide-based curing package, calendared, formed into shape, placed in a mold, and vulcanized.

In another example, when the resilient polymeric material is a foamed material, the material may be foamed during a molding process, such as an injection molding process. A thermoplastic polymeric material may be melted in the barrel of an injection molding system and combined with a physical or chemical blowing agent and optionally a cross-linking agent, and then injected into a mold under conditions which activate the blowing agent, forming a molded foam.

Optionally, when the resilient polymeric material is a foamed material, the foamed material may be a compression molded foam. Compression molding may be used to alter the physical properties (e.g., density, stiffness and/or durometer) of a foam, or to alter the physical appearance of the foam (e.g., to fuse two or more pieces of foam, to shape the foam, etc.), or both.

The compression molding process desirably starts by forming one or more foam preforms, such as by injection molding and foaming a polymeric material, by forming foamed particles or beads, by cutting foamed sheet stock, and the like. The compression molded foam may then be made by placing the one or more preforms formed of foamed polymeric material(s) in a compression mold, and applying sufficient pressure to the one or more preforms to compress the one or more preforms in a closed mold. Once the mold is closed, sufficient heat and/or pressure is applied to the one or more preforms in the closed mold for a sufficient duration of time to alter the preform(s) by forming a skin on the outer surface of the compression molded foam, fuse individual foam particles to each other, permanently increase the density of the foam(s), or any combination thereof. Following the heating and/or application of pressure, the mold is opened and the molded foam article is removed from the mold.

Referring now to FIGS. 1 and 2, the outsole 204 includes the forefoot segment 210 and the heel segment 212 attached to the bottom surface 262 of the cushioning member 208, and the bladder segments 214 attached to the lower barrier layer 218 of the bladder 206. As shown, the forefoot segment 210 of the outsole 204 includes a plurality of cutouts 286a-286d corresponding to the cavities 282a, 282b and the depressions 284a, 284b of the cushioning member 208. Particularly, shapes of the cutouts 286a-286d correspond to the shapes of the cavities 282a, 282b and the depressions 284a, 284b such that the cavities 282a, 282b and the depressions 284a, 284b are exposed to the ground surface through the cutouts 286a-286d. The forefoot segment 210 of the outsole 204 may further include a toe cap 288 configured to extend over and protect the anterior end 18 of the upper 100.

The outsole segments 210, 212, 214 are formed of resilient materials configured to impart properties of abrasion resistance and traction to the sole structure 200. One or more of the outsole segments 210, 212, 214 may be formed of a first material having a higher durometer than the others of the outsole segments 210, 212, 214. For example, the bladder segments 214 may be formed of a rubber material having a first durometer, while the forefoot segment 210 and the heel segment 212 is formed of a foam material having a second durometer, less than the first durometer. In some examples, the bladder segments 214 may be integrally formed or overmolded with the cushions 232 of the bladder 206, such that the bladder segments 214 are part of the cushions 232 and the cushions 232 are exposed through the bottom surface 262 of the cushioning member 208.

The following Clauses provide an exemplary configuration for an article of footwear described above.

Clause 1: A bladder comprising a first fluid-filled segment including a first terminal end and a second terminal end disposed on opposite ends of the first fluid-filled segment along a first longitudinal axis of the first fluid-filled segment, and a second fluid-filled segment including a third terminal end and a fourth terminal end disposed on opposite ends of the second fluid-filled segment along a second longitudinal axis of the second fluid-filled segment, the second fluid-filled segment being (i) spaced apart from the first fluid-filled segment in a first direction transverse to the first longitudinal axis and the second longitudinal axis and (ii) convergent with the first fluid-filled segment.

Clause 2: The bladder of Clause 1, further comprising a third fluid-filled segment extending between the first fluid-filled segment and the second fluid-filled segment.

Clause 3: The bladder of Clause 2, wherein the third fluid-filled segment fluidly couples the first fluid-filled segment and the second fluid-filled segment.

Clause 4: The bladder of Clause 2, wherein the third fluid-filled segment is disposed transverse to the first longitudinal axis and the second longitudinal axis.

Clause 5: The bladder of Clause 2, further comprising a fourth fluid-filled segment and a fifth fluid-filled segment disposed on opposite sides of the third fluid-filled segment in a direction extending along the first longitudinal axis and the second longitudinal axis.

Clause 6: The bladder of Clause 5, wherein the fourth fluid-filled segment and the fifth fluid-filled segment fluidly couple the first fluid-filled segment and the second fluid-filled segment.

Clause 7: The bladder of Clause 5, further comprising a web area extending between the third fluid-filled segment and the fourth fluid-filled segment and between the third fluid-filled segment and the fifth fluid-filled segment.

Clause 8: The bladder of Clause 7, wherein the web area is recessed from a plane extending tangent to a first outer surface of the third fluid-filled segment, the fourth fluid-filled segment, and the fifth fluid-filled segment on a first side of the bladder.

Clause 9: The bladder of Clause 8, wherein the web area is recessed from a plane extending tangent to a second outer surface of the third fluid-filled segment, the fourth fluid-filled segment, and the fifth fluid-filled segment on a second side of the bladder, the second side of the bladder being formed on an opposite side of the bladder than the first side.

Clause 10: The bladder of Clause 1, wherein the bladder is formed from a first barrier sheet and a second barrier sheet.

Clause 11: The bladder of Clause 10, wherein the first barrier sheet and the second barrier sheet are formed from the same material.

Clause 12: The bladder of Clause 10, wherein the first barrier sheet and the second barrier sheet are formed from different materials.

Clause 13: The bladder of Clause 10, wherein one of the first barrier sheet and the second barrier sheet is substantially transparent and the other of the first barrier sheet and the second barrier sheet is opaque.

Clause 14: The bladder of Clause 1, wherein the first fluid-filled segment tapers in a direction along the first longitudinal axis and the second fluid-filled segment tapers in a direction along the second longitudinal axis.

Clause 15: A sole structure incorporating the bladder of Clause 1.

Clause 16: The sole structure of Clause 15, wherein the first fluid-filled segment and the second fluid-filled segment converge in a direction from a heel region to a forefoot region of the sole structure.

Clause 17: An article of footwear incorporating the bladder of Clause 1.

Clause 18: The article of footwear of Clause 17, wherein the first fluid-filled segment and the second fluid-filled segment converge in a direction from a heel region to a forefoot region of the article of footwear.

Clause 19: The article of footwear of Clause 17, wherein the first fluid-filled segment and the second fluid-filled segment are exposed at a ground-contacting surface of the article of footwear.

Clause 20: The article of footwear of Clause 19, wherein the first fluid-filled segment is exposed at one of a medial side and a lateral side of a sole structure of the article of footwear and the second fluid-filled segment is exposed at the other of the medial side and the lateral side of the sole structure of the article of footwear.

Clause 21: An article of footwear comprising a bladder comprising a first fluid-filled segment including a first terminal end and a second terminal end disposed on opposite ends of the first fluid-filled segment along a first longitudinal axis of the first fluid-filled segment, the first longitudinal axis extending in a first direction from a heel region of the article of footwear to a forefoot region of the article of footwear, a second fluid-filled segment spaced apart from the first fluid-filled segment in a second direction transverse to the first direction and including a third terminal end and a fourth terminal end disposed on opposite ends of the second fluid-filled segment along a second longitudinal axis of the second fluid-filled segment, and a third fluid-filled segment extending in the second direction between the first fluid-filled segment and the second fluid-filled segment.

Clause 22: The article of footwear of Clause 21, wherein the first fluid-filled segment and the second fluid-filled segment are convergent.

Clause 23: The article of footwear of Clause 22, wherein the first fluid-filled segment and the second fluid-filled segment converge in a direction from the heel region to the forefoot region.

Clause 24: The article of footwear of Clause 21, wherein the third fluid-filled segment fluidly couples the first fluid-filled segment and the second fluid-filled segment.

Clause 25: The article of footwear of Clause 22, further comprising a fourth fluid-filled segment and a fifth fluid-filled segment disposed on opposite sides of the third fluid-filled segment in the first direction.

Clause 26: The article of footwear of Clause 25, wherein the fourth fluid-filled segment and the fifth fluid-filled segment fluidly couple the first fluid-filled segment and the second fluid-filled segment.

Clause 27: The article of footwear of Clause 25, further comprising a web area extending between the third fluid-filled segment and the fourth fluid-filled segment and between the third fluid-filled segment and the fifth fluid-filled segment.

Clause 28: The article of footwear of Clause 27, wherein the web area is recessed from a plane extending tangent to a first outer surface of the third fluid-filled segment, the fourth fluid-filled segment, and the fifth fluid-filled segment on a first side of the bladder.

Clause 29: The article of footwear of Clause 28, wherein the web area is recessed from a plane extending tangent to a second outer surface of the third fluid-filled segment, the fourth fluid-filled segment, and the fifth fluid-filled segment on a second side of the bladder, the second side of the bladder being formed on an opposite side of the bladder than the first side.

Clause 30: The article of footwear of Clause 21, wherein the bladder is formed from a first barrier sheet and a second barrier sheet.

Clause 31: The article of footwear of Clause 30, wherein the first barrier sheet and the second barrier sheet are formed from the same material.

Clause 32: The article of footwear of Clause 30, wherein the first barrier sheet and the second barrier sheet are formed from different materials.

Clause 33: The article of footwear of Clause 30, wherein one of the first barrier sheet and the second barrier sheet is substantially transparent and the other of the first barrier sheet and the second barrier sheet is opaque.

Clause 34: The article of footwear of Clause 33, wherein the other of the first barrier sheet and the second barrier sheet forms a ground-contacting surface of the article of footwear.

Clause 35: The article of footwear of Clause 21, wherein the first fluid-filled segment tapers in a direction along the first longitudinal axis and the second fluid-filled segment tapers in a direction along the second longitudinal axis.

Clause 36: The article of footwear of Clause 21, wherein the first fluid-filled segment and the second fluid-filled segment are exposed at a ground-contacting surface of the article of footwear.

Clause 37: The article of footwear of Clause 21, wherein the first fluid-filled segment is exposed at one of a medial side and a lateral side of a sole structure of the article of footwear and the second fluid-filled segment is exposed at the other of the medial side and the lateral side of the sole structure of the article of footwear.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A bladder comprising:
a first barrier layer and a second barrier layer cooperatively defining a chamber including a plurality of fluid-filled segments, wherein the plurality of fluid-filled segments comprise:
a first fluid-filled segment having a tubular shape and including i) a first terminal end having a first thickness defined by a first distance between an upper surface of the bladder and a lower surface of the bladder and ii) a second terminal end disposed on an opposite end of the first fluid-filled segment than the first terminal end and having a second thickness defined by second distance between the upper surface of the bladder and the lower surface of the bladder, the second thickness of the second terminal end being greater than the first thickness of the first terminal end, an entirety of the first fluid-filled segment extending along a first longitudinal axis;
a second fluid-filled segment having a tubular shape including i) a third terminal end having a third thickness defined by a third distance between the upper surface of the bladder and the lower surface of the bladder and ii) a fourth terminal end disposed on an opposite end of the second fluid-filled segment than the third terminal end and having a fourth thickness defined by a fourth distance between the upper surface of the bladder and the lower surface of the bladder, the fourth thickness of the fourth terminal end being greater than the third thickness of the third terminal end, an entirety of the second fluid-filled segment extending along a second longitudinal axis, the second fluid-filled segment being spaced apart from the first fluid-filled segment in a direction transverse to the first longitudinal axis and the second longitudinal axis and convergent with the first fluid-filled segment, the first terminal end and the third terminal end being disposed closer to one another than the second terminal end and the fourth terminal end; and
a third fluid-filled segment, a fourth fluid-filled segment, and a fifth fluid-filled segment each extending between the first fluid-filled segment and the second fluid-filled segment along a respective longitudinal axis in the direction transverse to the first longitudinal axis and the second longitudinal axis, the third fluid-filled segment and the fourth fluid-filled segment defining a first recess between the third fluid-filled segment and the fourth fluid-filled segment and the third fluid-filled segment and the fifth fluid-filled segment defining a second recess between the third fluid-filled segment and the fifth fluid-filled segment, the first recess and the second recess extending continuously and uninterrupted along respective longitudinal axes from the first fluid-filled segment to the second fluid-filled segment;
wherein the first terminal end, the second terminal end, the third terminal end, and the fourth terminal end each include compound curvatures associated with the respective first and second barrier layers,
wherein the first barrier layer includes i) a first portion at each of the first terminal end of the first fluid-filled segment and the third terminal end of the second fluid-filled segment, the first portion having a first radius, ii) a second portion at each of the first terminal end of the first fluid-filled segment and the third terminal end of the second fluid-filled segment, the second portion defining an intermediate portion at each of the first terminal end and the third terminal end and having a second radius, iii) a third portion at each of the second terminal end of the first fluid-filled segment and the fourth terminal end of the second fluid-filled segment, the third portion having a third radius, and iv) a fourth portion at each of the second terminal end of the first fluid-filled segment and the fourth terminal end of the second fluid-filled segment, the fourth portion defining an intermediate portion at each of the second terminal end and the fourth terminal end and having a fourth radius, the second radius being greater than the first radius and providing a relatively flat-faced profile to the intermediate portion at each of the first terminal end and the third terminal end compared with a profile of the first portion at each of the first terminal end and the third terminal end, and the fourth radius being greater than the third radius and providing a relatively flat-faced profile to the intermediate portion at each of the second terminal end and the fourth terminal end compared with a profile of the third portion at each of the second terminal end and the fourth terminal end.

2. The bladder of claim 1, wherein a central, longitudinal axis of the third fluid-filled segment extends parallel to a central, longitudinal axis of the fourth fluid-filled segment.

3. The bladder of claim 2, wherein a central, longitudinal axis of the third fluid-filled segment extends parallel to a central, longitudinal axis of the fifth fluid-filled segment.

4. The bladder of claim 1, wherein at least one of the third fluid-filled segment, the fourth fluid-filled segment, and the fifth fluid-filled segment fluidly couple the first fluid-filled segment and the second fluid-filled segment.

5. The bladder of claim 1, further comprising a web area extending between the third fluid-filled segment and the fourth fluid-filled segment at the first recess and between the third fluid-filled segment and the fifth fluid-filled segment at the second recess.

6. The bladder of claim 5, wherein the web area is recessed from a plane extending tangent to a first outer surface of the third fluid-filled segment, the fourth fluid-filled segment, and the fifth fluid-filled segment on a first side of the bladder.

7. The bladder of claim 6, wherein the web area is recessed from a plane extending tangent to a second outer surface of the third fluid-filled segment, the fourth fluid-filled segment, and the fifth fluid-filled segment on a second side of the bladder, the second side of the bladder being formed on an opposite side of the bladder than the first side.

8. The bladder of claim 1, wherein the first fluid-filled segment tapers in a direction along the first longitudinal axis and the second fluid-filled segment tapers in a direction along the second longitudinal axis.

9. An article of footwear comprising:
a bladder comprising:
a first barrier layer and a second barrier layer cooperatively defining a chamber including a plurality of fluid-filled segments, wherein the plurality of fluid-filled segments comprise:
a first fluid-filled segment having a tubular shape and including i) a first terminal end having a first thickness defined by a first distance between an upper surface of the bladder and a lower surface of the bladder and ii) a second terminal end disposed on an opposite end of the first fluid-filled segment than the first terminal end along a first longitudinal axis and having a second thickness defined by a second distance between the upper surface of the bladder and the lower surface of the bladder, the second thickness of the second terminal end being greater than the first thickness of the first terminal end, the first longitudinal axis extending in a first direction from a heel region of the article of footwear to a forefoot region of the article of footwear;
a second fluid-filled segment spaced apart from the first fluid-filled segment in a second direction transverse to the first direction, the second fluid-filled segment having a tubular shape and including i) a third terminal end having a third thickness defined by a third distance between the upper surface of the bladder and the lower surface of the bladder and ii) a fourth terminal end disposed on an opposite end of the second fluid-filled segment than the third terminal end along a second longitudinal axis and having a fourth thickness defined by a fourth distance between the upper surface of the bladder and the lower surface of the bladder, the fourth thickness of the fourth terminal end being greater than the third thickness of the third terminal end, the third terminal end being spaced apart from the first terminal end by a first distance and the fourth terminal end being spaced apart from the second terminal end by a second distance greater than the first distance between the first terminal end and the third terminal end, the first fluid-filled segment and the second fluid-filled segment disposed in the heel region and extending into a mid-foot region of the article of footwear;
a third fluid-filled segment extending in the second direction between the first fluid-filled segment and the second fluid-filled segment;
a fourth fluid-filled segment extending in the second direction between the first fluid-filled segment and the second fluid-filled segment, the fourth fluid-filled segment including a central, longitudinal axis that extends parallel to a central, longitudinal axis of the third fluid-filled segment; and
a first web area disposed between the third fluid-filled segment and the fourth fluid-filled segment and extending continuously and uninterrupted from the first fluid-filled segment to the second fluid-filled segment;
wherein the first terminal end, the second terminal end, the third terminal end, and the fourth terminal end each include compound curvatures associated with the respective first and second barrier layers,
wherein the first barrier layer includes i) a first portion at each of the first terminal end of the first fluid-filled segment and the third terminal end of the second fluid-filled segment, the first portion having a first radius, ii) a second portion at each of the first terminal end of the first fluid-filled segment and the third terminal end of the second fluid-filled segment, the second portion defining an intermediate portion at each of the first terminal end and the third terminal end and having a second radius, iii) a third portion at each of the second terminal end of the first fluid-filled segment and the fourth terminal end of the second fluid-filled segment, the third portion having a third radius, and iv) a fourth portion at each of the second terminal end of the first fluid-filled segment and the fourth terminal end of the second fluid-filled segment, the fourth portion defining an intermediate portion at each of the second terminal end and the fourth terminal end and having a fourth radius, the second radius being greater than the first radius and providing a relatively flat-faced profile to an intermediate portion at each of the first terminal end and the third terminal end compared with a profile of the first portion at each of the first terminal end and the third terminal end, and the fourth radius being greater than the third radius and providing a relatively flat-faced profile to an intermediate portion at each of the second terminal end and the fourth terminal end compared with a profile of the third portion at each of the second terminal end and the fourth terminal end.

10. The article of footwear of claim 9, wherein the first fluid-filled segment and the second fluid-filled segment are convergent.

11. The article of footwear of claim 9, wherein the third fluid-filled segment fluidly couples the first fluid-filled segment and the second fluid-filled segment.

12. The article of footwear of claim 9, further comprising a fifth fluid-filled segment disposed on an opposite side of the third fluid-filled segment than the fourth fluid-filled segment.

13. The article of footwear of claim 12, wherein the fourth fluid-filled segment and the fifth fluid-filled segment fluidly couple the first fluid-filled segment and the second fluid-filled segment.

14. The article of footwear of claim 12, further comprising a second web area extending between the third fluid-filled segment and the fifth fluid-filled segment.

15. The article of footwear of claim 14, wherein the first web area and the second web area are recessed from a plane extending tangent to a first outer surface of the third fluid-filled segment, the fourth fluid-filled segment, and the fifth fluid-filled segment on a first side of the bladder.

16. The article of footwear of claim 15, wherein the first web area and the second web area are recessed from a plane extending tangent to a second outer surface of the third fluid-filled segment, the fourth fluid-filled segment, and the fifth fluid-filled segment on a second side of the bladder, the second side of the bladder being formed on an opposite side of the bladder than the first side.

17. The article of footwear of claim 9, wherein the first fluid-filled segment tapers in a direction along the first longitudinal axis and the second fluid-filled segment tapers in a direction along the second longitudinal axis.

* * * * *